United States Patent
Tanabe et al.

(10) Patent No.: US 7,540,002 B2
(45) Date of Patent: May 26, 2009

(54) DISC LOADING DEVICE WITH SEPARATE CONVEYING UNITS FOR THE DISC AND THE DISC CARTRIDGE CONTAINING THE DISC

(75) Inventors: Naohisa Tanabe, Osaka (JP); Yuji Ariyoshi, Toyonaka (JP)

(73) Assignee: Panasonic Corporation, Osaka (JP)

( * ) Notice: Subject to any disclaimer, the term of this patent is extended or adjusted under 35 U.S.C. 154(b) by 1083 days.

(21) Appl. No.: 10/965,228

(22) Filed: Oct. 15, 2004

(65) Prior Publication Data

US 2005/0108738 A1 May 19, 2005

(30) Foreign Application Priority Data

Oct. 16, 2003 (JP) ............................. 2003-356097

(51) Int. Cl.
 *G11B 17/057* (2006.01)
(52) U.S. Cl. .................................................. 720/628
(58) Field of Classification Search ................ 720/616, 720/628; 369/15, 77.11, 77.21; 360/99.02, 360/99.06
See application file for complete search history.

(56) References Cited

U.S. PATENT DOCUMENTS

| 5,737,293 | A | 4/1998 | Kawamura et al. | 720/628 |
|---|---|---|---|---|
| 6,072,164 | A | 6/2000 | Tate et al. | |
| 6,388,974 | B1 * | 5/2002 | Kato | 720/627 |
| 2002/0036956 | A1 * | 3/2002 | Inatani et al. | 369/30.85 |
| 2002/0181380 | A1 * | 12/2002 | Wada et al. | 369/77.2 |
| 2003/0058773 | A1 | 3/2003 | Kabasawa | 720/636 |
| 2005/0022216 | A1 * | 1/2005 | Bae | 720/601 |

FOREIGN PATENT DOCUMENTS

| EP | 0526204 | 2/1993 |
|---|---|---|
| EP | 0992990 | 4/2000 |
| EP | 1087389 | 3/2001 |
| JP | 3218624 | 9/1991 |
| JP | 5226272 | 9/1993 |
| JP | 9246200 | 9/1997 |
| JP | 09251695 | 9/1997 |
| JP | 2004 31842 | 1/2004 |

OTHER PUBLICATIONS

British Search Report dated Feb. 8, 2005.
Japanese Office Action dated Mar. 6, 2007 with English translation.

* cited by examiner

*Primary Examiner*—Julie Anne Watko
(74) *Attorney, Agent, or Firm*—Dickinson Wright, PLLC

(57) ABSTRACT

A disc loading device includes a first conveying unit to convey a disc and a second conveying unit to convey a cartridge containing the disc. When the disc is inserted or ejected, the disc is conveyed by the first conveying unit. When the cartridge is inserted or ejected, the cartridge is conveyed by the second conveying unit. When the cartridge is not detected by a cartridge detecting unit, a first conveying unit moving unit moves the first conveying unit to a first position and holds the first conveying unit in the first position, and when the cartridge is detected by the cartridge detecting unit, the first conveying unit moving unit moves the first conveying unit to a second position and holds the first conveying unit in the second position.

6 Claims, 8 Drawing Sheets ated resilient member. Reference numeral 16 represents a pressing member for pressing the inserted disc 1 or cartridge 15 against the roller 4. The pressing member 16 is pushed downward by a non-illustrated resilient member. Reference numeral 17 represents a support member that supports the roller 4 so as to be rotatable.

DISC LOADING DEVICE WITH SEPARATE CONVEYING UNITS FOR THE DISC AND THE DISC CARTRIDGE CONTAINING THE DISC

BACKGROUND OF THE INVENTION

1. Field of the Invention

The present invention relates to a disc loading device in which a disc-form recording medium (hereinafter, referred to as disc) and a cartridge containing the disc are slotted in through a common opening.

2. Description of the Prior Art

In recent years, in the field of disc devices, DVD recorders/players capable of recording and playback onto and from DVD media have been markedly spreading. Examples of DVDs for recording and playback include a DVD-RAM. The DVD-RAM is divided into a type contained in a cartridge so that the recording surface of the disc is protected and a type not contained in a cartridge (hereinafter, referred to as disc) To enhance usability in order to further spread DVD-RAMs, it is desired to develop a disc loading device that allows a cartridge and a disc not contained in a cartridge to be slotted in through a common opening.

A conventional disc loading device in which the disc and the cartridge can be slotted in through a common opening will be described.

Conventionally, as a disc loading device, one described in Japanese Laid-Open Patent Application No. H09-251695 has been known. FIG. 7 is a plan view showing a condition where the disc is slotted in in the conventional disc loading device. FIG. 8 is a side view showing a condition in which the cartridge is slotted in.

In FIG. 7, reference numeral 1 represents a disc, reference numeral 2 represents an opening, and reference numeral 3 represents a turn table. Reference numeral 4 represents a roller that conveys the disc while rotating. Reference numeral 5 represents a roller gear attached to the roller 4. Reference numeral 6 represents a base where the turn table 3 and the roller 4 are disposed. Reference numeral 7 represents a centering plate that is movable in the X1 direction, that is, the loading direction and in the X2 direction, that is, the ejection direction and is pushed in the X2 direction by a non-illustrated resilient member. Reference numeral 8 represents a centering groove provided in the centering plate 7 to latch the disc 1 in the centering of the disc 1 in the play position. Reference numeral 9 represents a locking member that restricts the range of movement, in the X1 direction, of the centering plate 7. The locking member is pivotable about a shaft provided at an end in the X2 direction, and is pushed in the locking direction (in the figure, the direction of the arrow A) by a non-illustrated resilient member. Reference numeral 10 represents a latching member provided on the centering plate 7 for latching to the locking member 9. Reference numeral 11 represents a slide plate disposed so as to be movable in the X1 and X2 directions. Reference numeral 12 represents an interlocking lever that is pivotable about a shaft provided on the centering plate and in which a shaft engaged with an L-shaped groove of the slide plate 11 is provided at the other end. Reference numeral 13 represents a support arm that is pivotable about a shaft provided at an end in the X1 direction and pushed in the X2 direction by a non-illustrated resilient member. Reference numeral 14 represents a shutter opening member for opening the shutter of a subsequently-described cartridge 15. The shutter opening member 14 is provided so as to be pivotable about a shaft in a U-shaped groove of the support arm 13. An engagement pin for opening the shutter of the cartridge 15 droops from an end of the shutter opening member 14, and when the cartridge 15 is not loaded, the engagement pin is pushed to an upper position by a non-illustrated resilient member. Reference numeral 16 represents a pressing member for pressing the inserted disc 1 or cartridge 15 against the roller 4. The pressing member 16 is pushed downward by a non-illustrated resilient member. Reference numeral 17 represents a support member that supports the roller 4 so as to be rotatable.

The operation of the conventional disc loading device structured as described above will be described.

First, a case where the disc 1 is slotted in will be described. When the disc 1 is inserted through the opening 2, the insertion of the disc 1 is detected by a non-illustrated detection switch, and rotation is transmitted to the roller gear 5 by the driving by a non-illustrated loading motor to rotate the roller 4, so that the disc 1 is drawn inside. At this time, the disc 1 is drawn in while being pressed against the roller 4 by the pressing member 16. When the disc 1 is drawn in, its rim abuts the centering groove 8, and the centering plate 7 is gradually pushed in as the disc 1 is loaded. When the rim of the disc 1 abuts a non-illustrated abutment piece of the locking member 9, the locking member 9 is pushed out against the pushing force of the resilient member in the locking release direction (in the direction opposite to the arrow in FIG. 7), so that the centering plate 7 is further pushed in without the latching member 10 being latched by the locking member 9. When the position of abutment of the disc 1 on the abutment piece of the locking member 9 exceeds a maximum rim (the rim in the direction of the disc radius perpendicular to the loading direction), the locking member 9 gradually returns in the locking direction by the pushing force of the resilient member, the latching member 10 is latched to the locking member 9, and the pushing in of the centering plate 7 is restricted. Then, the centering of the disc 1 in the play position is performed. At this time, the engagement pin at the end of the shutter opening member 14 is pushed by the non-illustrated resilient member to a position that is away from the upper surface side of the disc 1.

Subsequently, a case where the cartridge 15 is slotted in will be described with reference to FIG. 8. When the cartridge 15 is inserted through the opening 2, the insertion of the cartridge 15 is detected by the non-illustrated detection like in the above-described case, and the roller 4 rotates so that the cartridge 15 is drawn inside. At this time, the cartridge 15 is drawn in while being pressed against the roller 4 by the pressing member 16. When the cartridge 15 is drawn in, an end of the cartridge 15 abuts a cartridge receiving portion 7a, and the centering plate 7 is gradually pushed in as the cartridge 15 is loaded. When a side surface of the cartridge 15 abuts the abutment piece of the locking member 9, the locking member 9 is pushed out in the locking release direction, so that the centering plate 7 is further pushed in without the latching member 10 being latched to the locking member 9. When the centering plate 7 is moved to the farthest part of the base 6 in the X1 direction, the movement of the centering plate 7 is restricted by a stopper member provided in the farthest part, thereby performing the centering of the disc 1 inside the cartridge 15 in the play position.

At this time, the lower end, in the X1 direction, of the shutter opening member 14 runs on the upper surface of the centering plate 7 as the centering plate 7 moves, whereby the shutter releasing member 14 is pivoted to a substantially horizontal direction. When the cartridge 15 is further drawn in from this condition, since the engagement pin of the shutter releasing member 14 is engaged with a non-illustrated engagement groove of the shutter of the cartridge 15, the shutter is gradually opened as the cartridge 15 moves, and the window of the cartridge 15 is completely opened when the cartridge 15 reaches the play position.

However, in the above-described conventional structure in which the disc 1 and the cartridge 15 are conveyed by the same conveying means the roller 4, when the cartridge 15 which is larger in weight and volume than the disc 1 is conveyed by the same conveying means, a slip occurs between the cartridge 15 and the roller 4 in the middle of the conveyance, so that a phenomenon occurs such that the cartridge 15 moves jerkily and is not conveyed smoothly, so that stable conveyance cannot be performed.

SUMMARY OF THE INVENTION

The present invention solves the above-mentioned conventional problem, and an object thereof is to provide a disc loading device capable of stably conveying the disc and the cartridge by their respective suitable conveying means.

To solve this object, a disc loading device of the present invention is a disc loading device, in a disc drive device, that allows a disc-form recording medium and a cartridge containing the disc-form recording medium to be slotted in through a single opening provided in a cabinet.

The disc loading device is provided with first conveying means for conveying the disc-form recording medium and second conveying means for conveying the cartridge.

When the disc-form recording medium is inserted or ejected, the disc-form recording medium is conveyed by the first conveying means.

When the cartridge is inserted or ejected, the cartridge is conveyed by the second conveying means.

According to the above-described structure, by conveying the disc and the cartridge by their respective suitable conveying means, the disc and the cartridge can be smoothly and stably conveyed without any jerkiness. Moreover, since both the disc and the cartridge can be inserted through a single opening, it is unnecessary to provide the device body, so that space efficiency is improved.

In the above-described structure, the following are provided: cartridge detecting means for detecting that the cartridge is inserted;

guiding means for guiding the inserted disc-form recording medium by pushing the disc-form recording medium in a direction of the first conveying means; and first conveying means moving means for moving the first conveying means selectively to a first position forming a space that allows the disc-form recording medium to be conveyed therethrough by sandwiching the disc-form recording medium between the guiding means and the first conveying means moving means or to a second position forming a space that allows the cartridge to be conveyed therethrough, and holding the first conveying means in the position to which the first conveying means is moved.

When the cartridge is not detected by the cartridge detecting means, the first conveying means moving means moves the first conveying means to the first position and holds the first conveying means in the first position, and when the cartridge is detected by the cartridge detecting means, the first conveying means moving means moves the first conveying means to the second position and holds the first conveying means in the second position.

According to the above-described structure, both the disc and the cartridge can be automatically slotted in through a single opening.

In the above-described structure, the cartridge detecting means is disposed between the opening and the first conveying means, and detects insertion only when the cartridge is inserted.

According to the above-described structure, when the cartridge is inserted, the cartridge is detected before the cartridge is inserted to the center of the disc-form recording medium contained in the cartridge, and the first conveying means is moved to the second position and the opening is widened, whereby the cartridge can be smoothly conveyed.

In the above-described structure, the cartridge detecting means detects an external wall part of the cartridge excluding a part of projection, in a direction perpendicular to the direction of insertion of the cartridge, of the disc-form recording medium contained in the cartridge.

According to the above-described structure, by detecting, of the part that passes through the opening 2 first when the disc or the cartridge is inserted, the part that is different between the disc and the cartridge, the cartridge can be accurately detected.

In the above-described structure, the first conveying means comprises a roller.

According to the above-described structure, by adopting a roller, optimum for disc conveyance, of a type pressed against the disc to convey the disc with the rotation, the disc can be smoothly and stably conveyed.

Another disc loading device of the present invention is a disc drive device that allows a disc-form recording medium and a cartridge containing the disc-form recording medium to be slotted in through a single opening provided in the cabinet. The disc drive device is provided with first conveying means for conveying the disc-form recording medium and second conveying means for conveying the cartridge. The cartridge is conveyed by being caused to follow the movement of the second conveying means with the claw provided on the second conveying means being engaged with the groove on the side surface of the cartridge.

According to the above-described structure, by conveying the cartridge with the claw of the second conveying means being engaged with the cartridge, the cartridge can be smoothly and stably conveyed without any slip or the like occurring between the cartridge and the conveying means in the middle of conveyance.

In the above-described structure, a disc latching member that receives and latches the conveyed disc-form recording medium and performs centering in the play position is provided in a position not interfering with the locus of movement of the cartridge.

According to the above-described structure, by enabling the centering, in the play position, of both the disc and the cartridge, the disc and the cartridge can be slotted in through a single opening.

In the above-described structure, a disc guide is provided that is disposed in a position opposed to the first conveying means and guides the disc-form recording medium that is being conveyed. The disc guide abuts the disc-form recording medium that is being conveyed, and pushes down the disc-form recording medium.

According to the above-described structure, by raising the turn table side of the disc by pushing down the opening side of the disc when the disc is inserted, the disc can be accurately guided to the disc latching member provided in an upper part at the back of the turn table.

DESCRIPTION OF THE PREFERRED EMBODIMENT

Hereinafter, an embodiment of the present invention will be described with reference to FIGS. 1 to 6.

Figure 1:
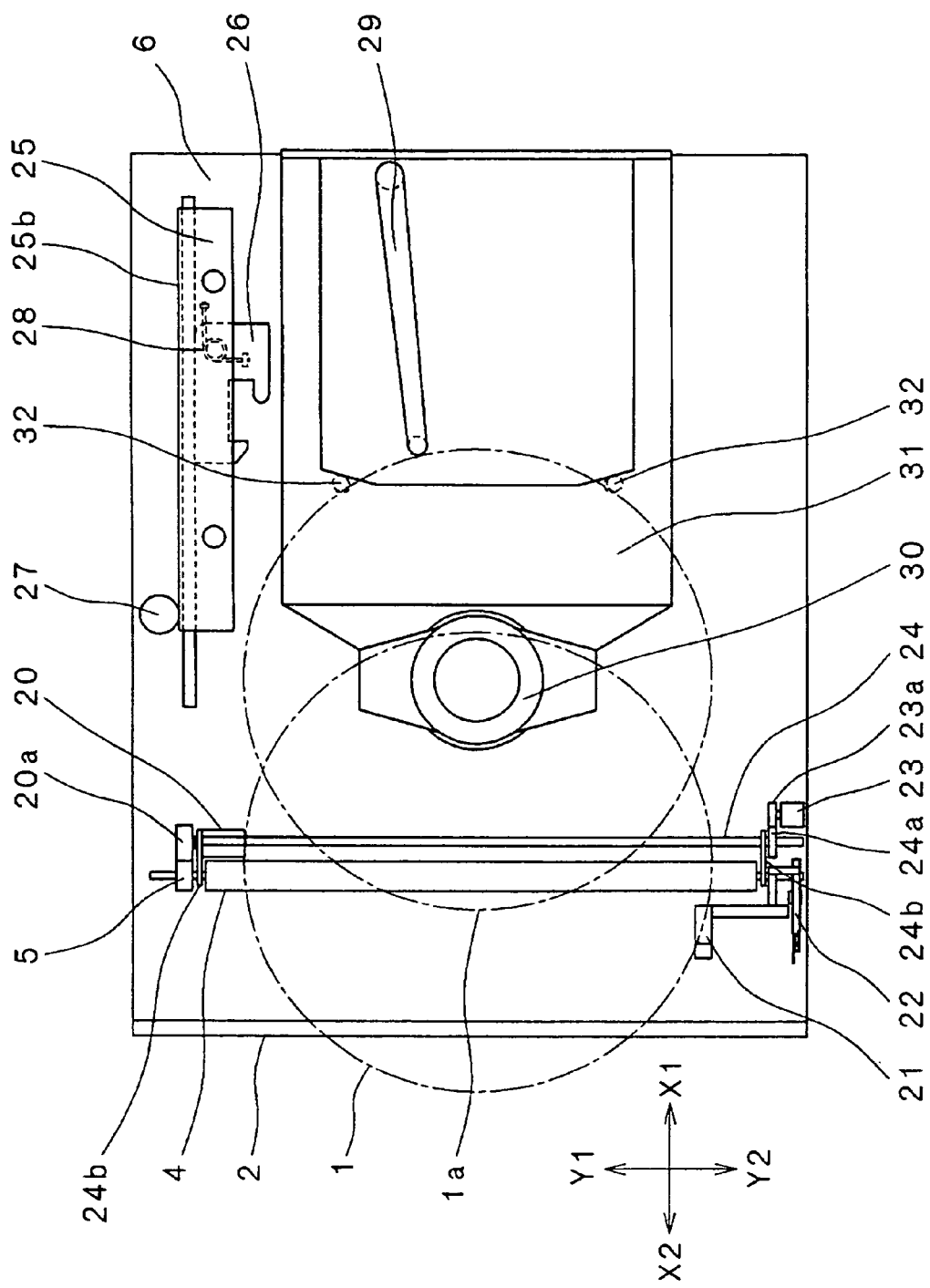
FIG. 1 is a plan view showing a condition where the disc is inserted in a disc loading device according to the embodiment of the present invention.
Figure 2:
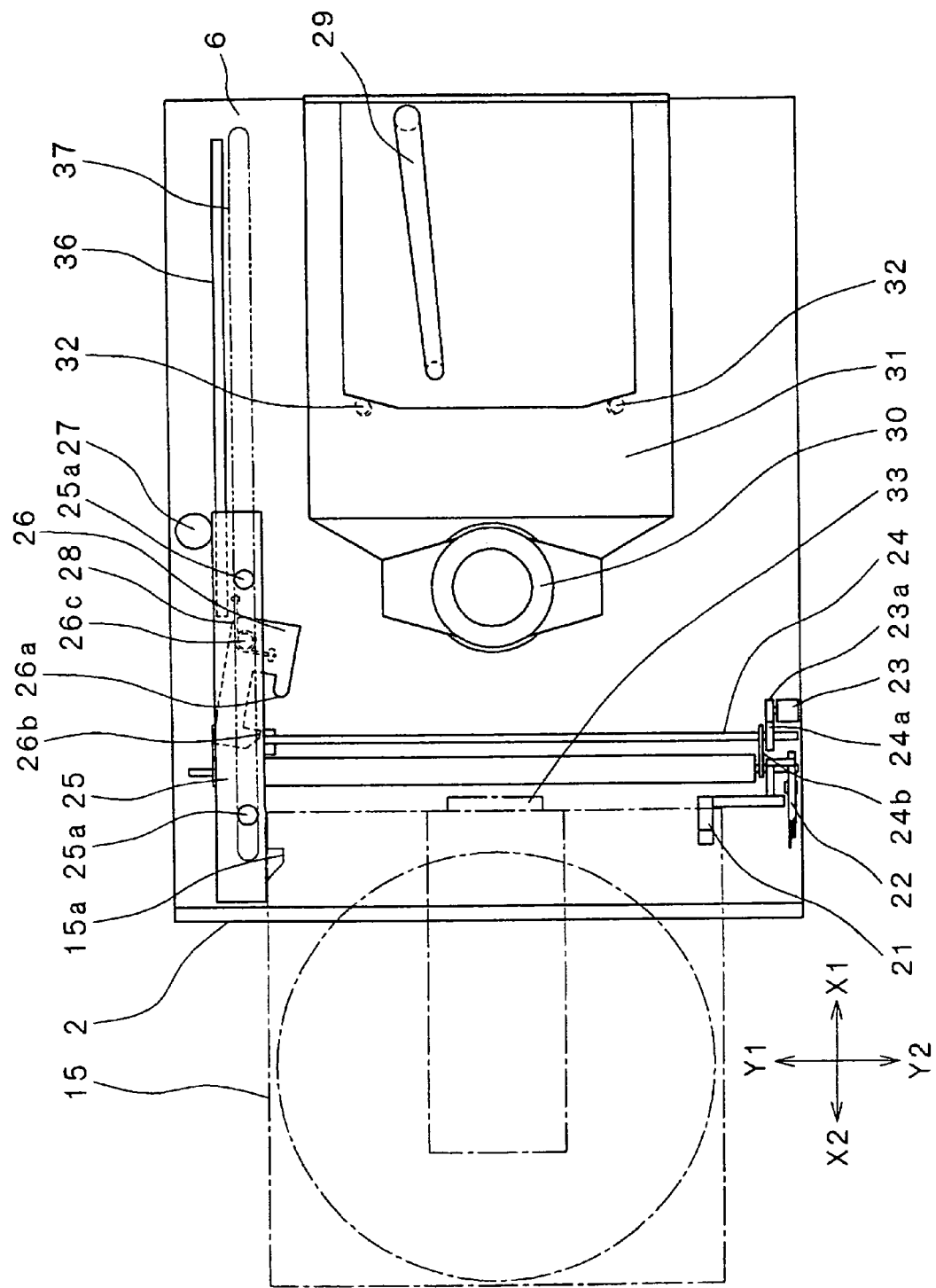
FIG. 2 is a plan view showing a condition immediately after the cartridge is inserted in the disc loading device according to the embodiment of the present invention.
Figure 3:
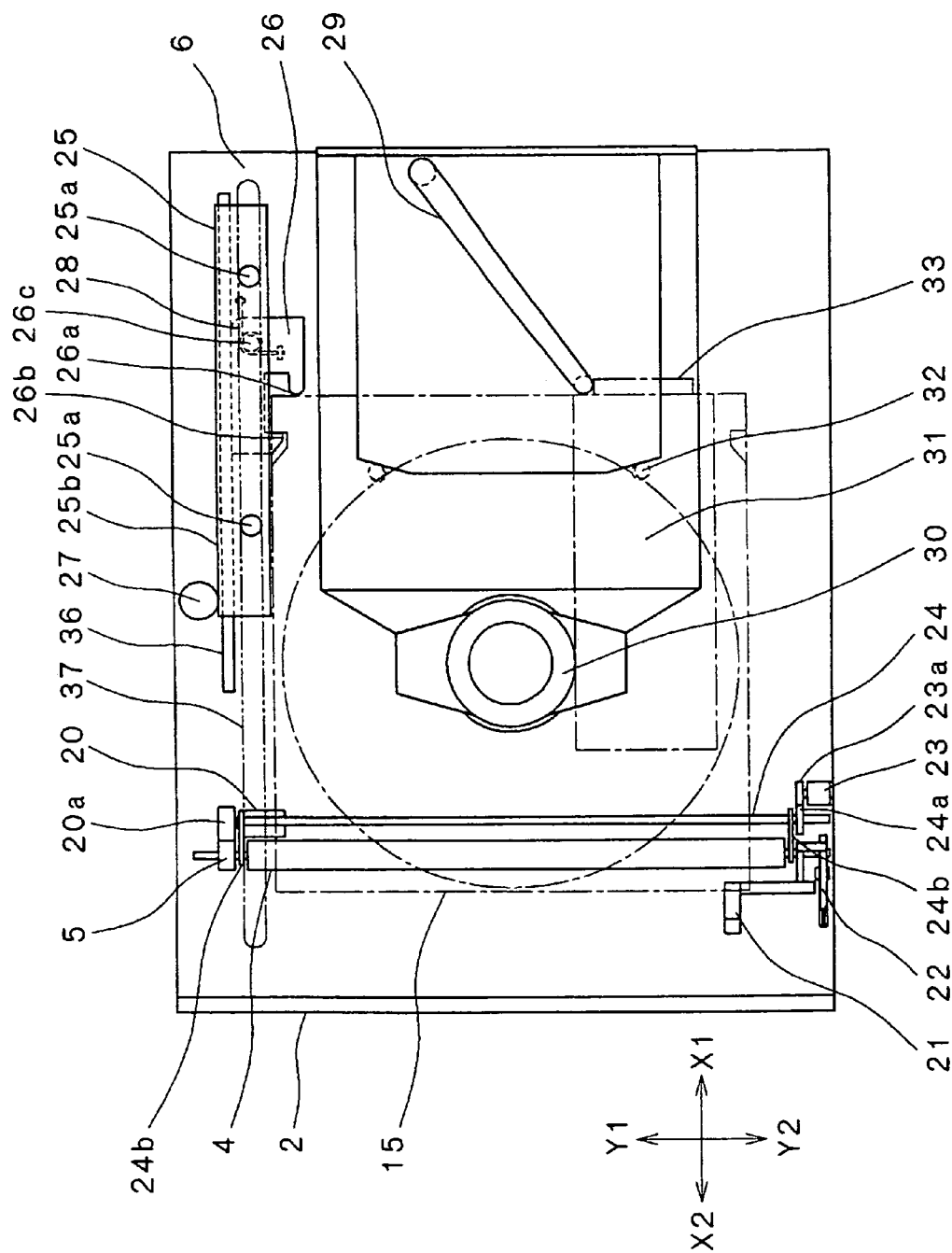
FIG. 3 is a plan view showing the play position when the cartridge is inserted in the disc loading device according to the embodiment of the present invention.
Figure 4:
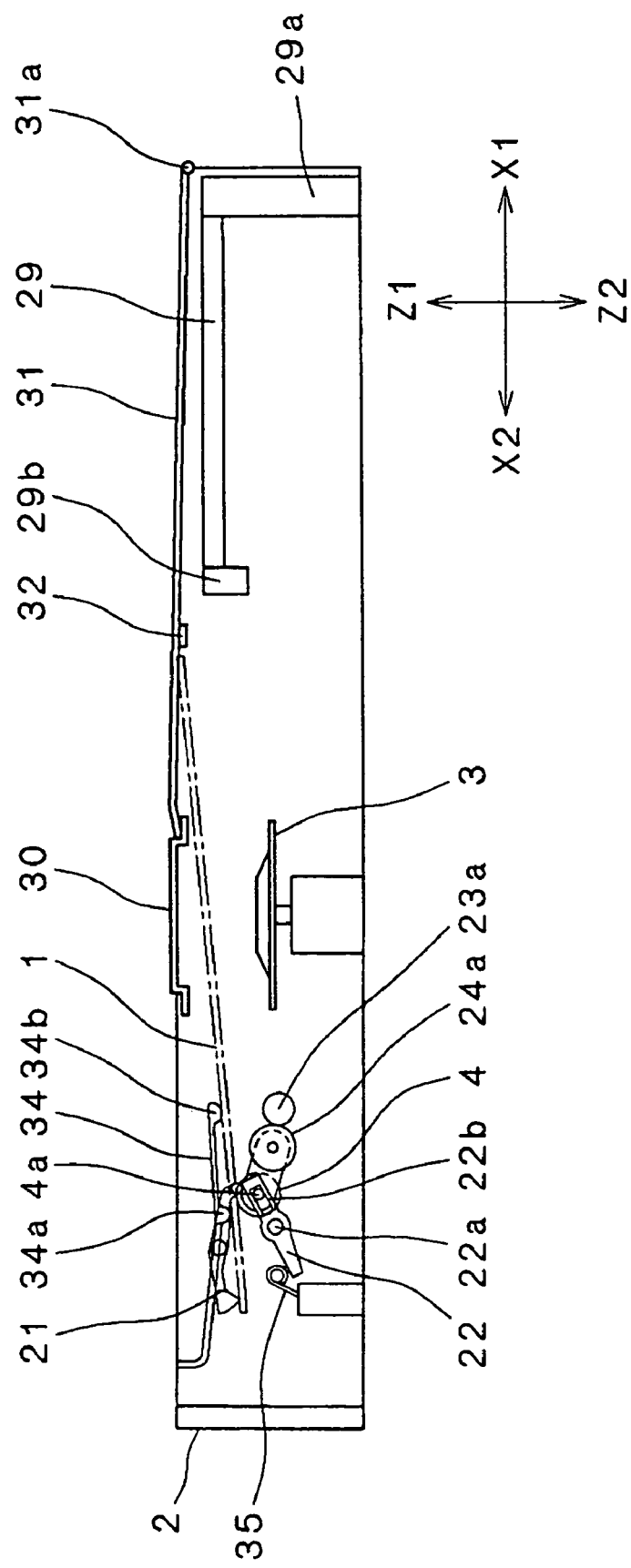
FIG. 4 is a side view showing a condition where the disc is inserted in the disc loading device according to the embodiment of the present invention.
Figure 5:
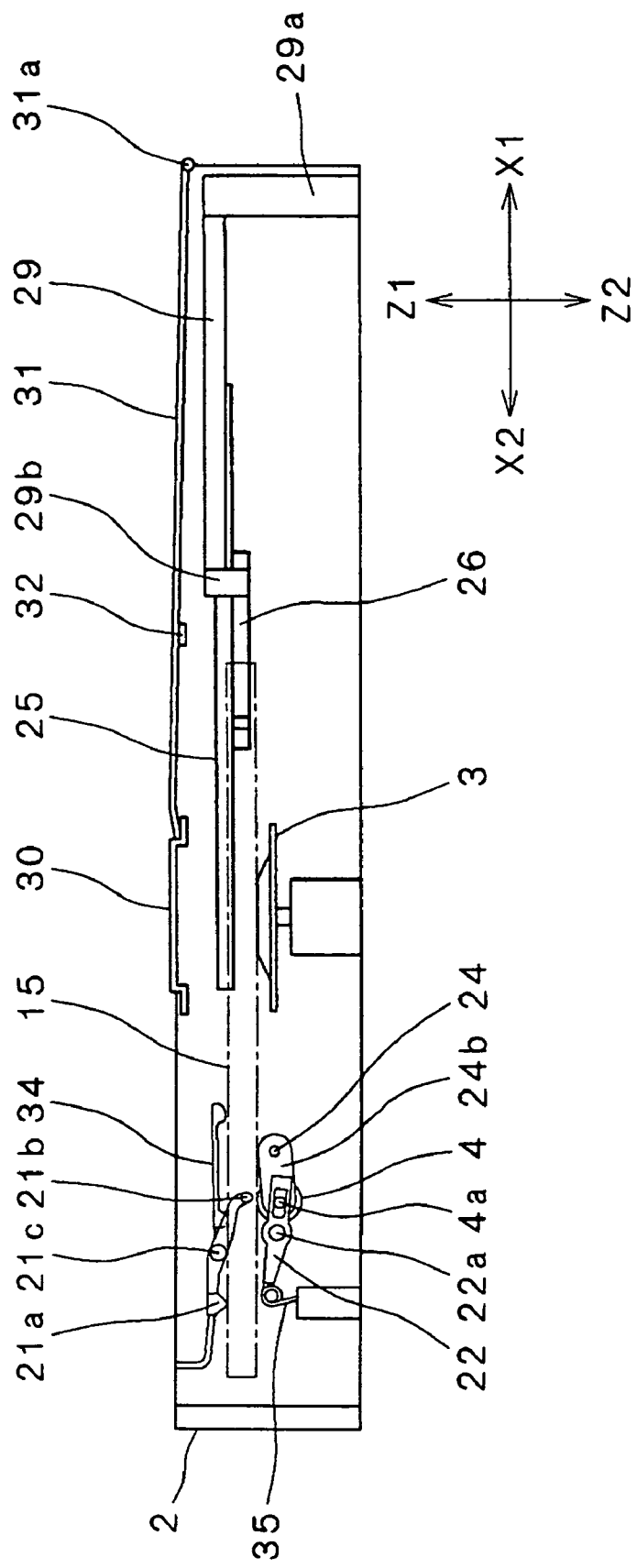
FIG. 5 is a side view showing a condition where the cartridge is inserted in the disc loading device according to the embodiment of the present invention.

FIG. 1 is a plan view showing a condition where the disc is inserted in a disc loading device according to the embodiment of the present invention. FIG. 2 is a plan view showing a condition immediately after the cartridge is inserted in the disc loading device according to the embodiment of the present invention. FIG. 3 is a plan view showing the play position when the cartridge is inserted in the disc loading device according to the embodiment of the present invention. FIG. 4 is a side view showing a condition where the disc is inserted in the disc loading device according to the embodiment of the present invention. FIG. 5 is a side view showing a condition where the cartridge is inserted in the disc loading device according to the embodiment of the present invention.

In the figures, the same elements as those of the conventional example are denoted by the same reference numerals and descriptions thereof are omitted. In FIGS. 1 to 5, reference numeral 20 represents a roller driving motor that drives the roller 4 as the first conveying means, and reference numeral 20a represents a roller driving motor gear that is attached to the shaft of the roller driving motor 20 and transmits the rotation of the roller driving motor 20 to the roller gear 5.

Reference numeral 21 represents a switching lever as the cartridge detecting means comprising a cartridge abutment portion 21a, a switching arm abutment portion 21b and a shaft 21c as shown in FIG. 5. The switching lever 21 is disposed so as to be pivotable about the shaft 21c, and pushed counterclockwise to the position of FIG. 4 by a non-illustrated resilient member. The cartridge abutment portion 21a of the switching lever 21 is disposed between the opening 2 and the roller 4, and detects insertion only when the cartridge 15 is inserted. For example, when the disc 1 is inserted, the cartridge abutment portion 21a is situated in a position not interfering with the space in the Z1 direction of the recording surface of the disc 1 when the upper surface of the disc 1 reaches a position abutting a guide portion 34a of a subsequently-described disc guide 34. Moreover, even when the upper surface of the disc 1 abuts the cartridge abutment portion 21a when the disc 1 is further conveyed after the upper surface of the disc 1 abuts the guide portion 34a of the disc guide 34, the switching arm abutment portion 21b does not abut a switching arm 22. Moreover, the cartridge abutment portion 21a of the switching lever 21 may detect the part of the cartridge 15 excluding the locus of movement of the disc surface when the disc 1 is moved until the rim of the disc 1 abuts both side surfaces, in a direction perpendicular to the insertion direction, of the cartridge 15 in the direction perpendicular to the insertion direction of the cartridge 15 under a condition where the rim of the disc 1 is in contact with the end, on the side of the insertion direction, of the cartridge 15. Further, the cartridge abutment portion 21a of the switching lever 21 may detect the outer part of the cartridge 15 excluding the part of projection of the recording surface of the disc 1 contained in the cartridge 15 is projected.

Reference numeral 22 represents a switching arm as the first conveying means moving means that is pivotable about a shaft 22a. The central shaft 4a of the roller 4 is engaged with an elongated hole 22b, and one end of a switching spring 35 is attached to the end on the opposite side with the shaft 22a in between. In the condition of FIG. 4, the switching arm 22 is pushed so that the roller 4 is held in the first position for the case where the disc 1 is conveyed, and in the condition of FIG. 5, the switching arm 22 is pushed so that the roller 4 is held in the second position not abutting the cartridge 15. While in the present embodiment, the roller 4 and the cartridge 15 do not abut each other when the cartridge 15 is conveyed, they may abut each other.

Reference numeral 23 represents a switching motor that generates a driving force to switch the position of the roller 4. Reference numeral 23a represents a switching motor gear that is attached to the shaft of the switching motor 23 and transmits the rotation of the switching motor 23 to a subsequently-described switching gear 24a. Reference numeral 24 represents a switching main shaft serving as the pivot when the roller 4 is pivoted from the first position to the second position. Reference numeral 24a represents a switching gear attached to the switching main shaft 24 and to which the rotation from the switching motor gear 23a is transmitted. Reference numeral 24b represents an arm to which the shaft 4a of the roller 4 and the switching main shaft 24 are attached. Reference numeral 25 represents a slide member provided so as to be slidable in the X1 and X2 directions by a guide pin 25a being engaged with a subsequently-described guide groove 37. When the disc 1 or the cartridge 15 is not inserted, the slide member 25 is set in the position of FIG. 2. Reference numeral 26 represents an engagement member as the second conveying means that is provided on the slide member 25 so as to be pivotable about a shaft 26c and is pushed clockwise to the position of FIG. 2 by a spring 28. When the cartridge abutment portion 26a abuts an end surface of the cartridge 15, the engagement member 26 pivots about the shaft 26c, so that a claw 26b is engaged with a groove 15a on a side surface of the cartridge 15. Reference numeral 27 represents a slide gear for sliding the slide member 25. The slide gear 27 meshes with a rack 25b provided on the slide member 25, so that rotation from a non-illustrated driving motor is transmitted.

Reference numeral 29 represents a shutter opener lever for opening a shutter 33 of the cartridge 15. The shutter opener lever 29 is provided so as to be pivotable about a shaft 29a, and is pushed clockwise to the position of FIG. 1 by a non-illustrated resilient member. An engagement pin 29b is provided for engagement with the shutter 33. Reference numeral 30 represents a damper that attaches the disc 1 placed on the turn table 3 to the turn table by pressure. Reference numeral 31 represents a clamping plate that is provided so as to be pivotable about a pivot shaft 31a and separates the slidably supported damper 30 from the turn table 3 when the disc 1 or the cartridge 15 is conveyed. The clamping plate 31 is provided so as to be pushed to the position of FIG. 4 by a non-illustrated resilient member when the disc 1 or the cartridge 15 is not inserted and to be pivotable by non-illustrated driving means. Reference numeral 32 represents disc latching members as the disc latching means that are provided on the clamping plate 31 for clamping the disc 1 for performing centering in the play position. Reference numeral 34 represents the disc guide as the guiding means for guiding the disc 1 when the disc 1 is conveyed. The disc guide 34 is provided in a position opposed to the roller 4. The disc guide 34 pushes down the opening 2 side of the disc 1 in the Z2 direction by pressing the disc 1 by the guide portions 34a and 34b when the disc 1 is inserted, thereby slightly raising the turntable 3 side of the disc 1 in the Z1 direction. Reference numeral 36 represents a guide provided on the base 6. While the slide member 25 is moving, the guide 36 abuts the engagement member 26 to thereby hold the engagement member 26 in a condition where the claw 26b is engaged with the cartridge 15 (the condition of FIG. 3). Reference numeral 37 represents the guide groove provided on a non-illustrated top plate. The guide pin 25a of the slide member 25 is engaged with the guide groove 37 to thereby guide the movement of the slide member 25. The turn table 3 and a non-illustrated optical pickup are both set so as to be movable in the Z1 and Z2 directions by non-illustrated driving means.

The operation of the disc loading device structured as described above will be described with reference to FIGS. 1 to 5.

First, a case where the disc 1 is inserted will be described.

When the disc 1 or the cartridge 15 is not inserted, the roller 4 is held in the position of FIG. 4 by the switching arm 22 by being pushed by the switching spring 35. The gap, in the Z1 direction, between the roller 4 and the disc guide 34 is set so that when the disc 1 is inserted, the disc 1 can be conveyed by sandwiching the disc 1 between the roller 4 and the guide portions 34a and 34b and pressing it. Specifically, the gap has a size slightly smaller than the thickness of the disc 1.

When the disc 1 is inserted through the opening 2, the insertion of the disc 1 is detected by a non-illustrated photosensor provided at the opening 2, rotation is transmitted to the roller 4 by the driving by the roller driving motor 20, and the disc 1 is drawn inside as the roller 4 rotates. At this time, the disc 1 is sandwiched between the guide portions 34a and 34b of the disc guide 34 and the roller 4 and the part, on the X2 direction side of the roller 4, of the disc 1 is pushed down in the Z2 direction by the guide portion 34a, whereby the disc 1 is conveyed with its X1 direction side end being slightly raised in the Z1 direction.

Then, the disc 1 is conveyed by the rotation of the roller 4, and when the disc 1 abuts the disc latching members 32, the rotation of the roller 4 is stopped. Then, the clamping plate 31 pivots counterclockwise about the pivot shaft 31a by the non-illustrated driving means, and moves the disc 1 in the Z2 direction while the disc 1 is held by the disc engagement member 32. At the same time, the turn table 3 and the non-illustrated optical pickup are moved in the Z1 direction by the non-illustrated driving means, and are stopped in the play position. Moreover, at the same time, the switching gear 24a is rotated by the driving by the switching motor 23, the roller 4 pivots counterclockwise about the switching main shaft 24, and in the play position, the disc 1 is held by being pushed by the switching arm 22 and the switching spring 35 in the position of FIG. 5 not abutting the roller 4. Then, the disc 1 is clamped by the damper 30 while being placed on the turn table 3, and thereafter, recording or playback onto or from the disc 1 is performed. When the disc 1 is inserted, the slide member 25 as conveying means for the cartridge 15 is also moved by the rotation of the slide gear 27 like a subsequently-described operation performed when the cartridge 15 is inserted. This is done in order to prevent the disc 1 from abutting the engagement member 26 while being conveyed. When the disc 1 is ejected, the above-described operation is performed in reverse order, and by the roller 4 rotating in the reverse direction, the disc 1 is ejected through the opening 2.

Subsequently, a case where the cartridge 15 is inserted will be described with reference to FIGS. 2, 3 and 5.

First, when the cartridge 15 is inserted through the opening 2, the insertion of the cartridge 15 is detected by a non-illustrated photosensor provided at the opening 2, and the roller 4 is rotated by the driving by the roller driving motor 20.

When the cartridge 15 is further inserted, the part of the upper surface of the cartridge 15 which part is inserted prior to the part of the disc 1 contained in the cartridge 15 abuts the cartridge abutment portion 21a of the switching lever 21, the switching lever 21 pivots about the shaft 21c, and the switching arm abutment portion 21b abuts the switching arm 22 to push down the switching arm 22. The switching arm 22 pivots about the shaft 22a, the roller 4 pivots about the switching main shaft 24, and the roller 4 is held in a position not abutting the lower surface of the cartridge 15 (the position of FIG. 5) by being pushed by the switching spring 35. At this time, the roller driving motor 20 stops rotating to stop the rotation of the roller 4.

When the cartridge 15 is further inserted, the end surface, in the X1 direction, of the cartridge 15 abuts the cartridge abutment portion 26a, the engagement member 26 pivots counterclockwise about the shaft 26c, and the claw 26b is engaged with the groove 15a on the side surface of the cartridge 15. Then, rotation is transmitted to the slide gear 27 by the driving by the non-illustrated driving means, and the slide member 25, together with the engagement member 26, is moved in the X1 direction along the guide groove 37. The cartridge 15 is conveyed with the movement of the slide member 25 while being engaged with the engagement member 26.

The cartridge 15 is conveyed in the X direction while the side surface, in the Y2 direction, of the cartridge 15 is restricted by abutting a non-illustrated guide. Moreover, while the slide member 25 is moving, the engagement member 26 is restricted by the guide 36 with the claw 26b being engaged with the cartridge 15.

Then, when the cartridge 15 is further conveyed, the engagement pin 29b of the shutter opener lever 29 abuts the shutter 33 of the cartridge 15. As the cartridge 15 is further conveyed, the shutter opener lever 29 pivots about the shaft 29a to open the shutter 33, and the play position is reached. Then, the clamping plate 31 pivots counterclockwise about the pivot shaft 31a by the non-illustrated driving means, and at the same time, the turn table 3 and the non-illustrated optical pickup are moved in the Z1 direction by the non-illustrated driving means and stopped in the play position. Then, the disc 1 contained in the cartridge 15 is clamped by the damper 30 while being placed on the turn table 3, and thereafter, recording or playback onto or from the disc 1 is performed.

When the cartridge 15 is ejected, the above-described operation is performed in reverse order, the slide gear 27 is rotated in the reverse direction, and by the slide member 25 moving in the X2 direction, the cartridge 15 is ejected through the opening 2. After the cartridge 15 is ejected, by the driving by the switching motor 23, the roller 4 is moved to the first position of FIG. 4 for the case where the disc 1 is conveyed, and stopped in the position.

As described above, according to the present embodiment, the roller 4 is provided as the conveying means for the disc 1, means for conveying the cartridge 15 together with the slide member 25 by engaging the claw 26b of the engagement member 26 provided on the slide member 25 with the side surface of the cartridge 15 is provided as the conveying means for the cartridge 15, when the disc 1 is conveyed, the disc 1 is conveyed by the roller 4 and when the cartridge 15 is inserted, the roller 4 is pushed down by the switching lever 21 and the cartridge 15 is conveyed by the slide member 25, whereby the disc 1 and the cartridge 15 can be smoothly and stably conveyed by their respective suitable conveying means.

Figure 6:
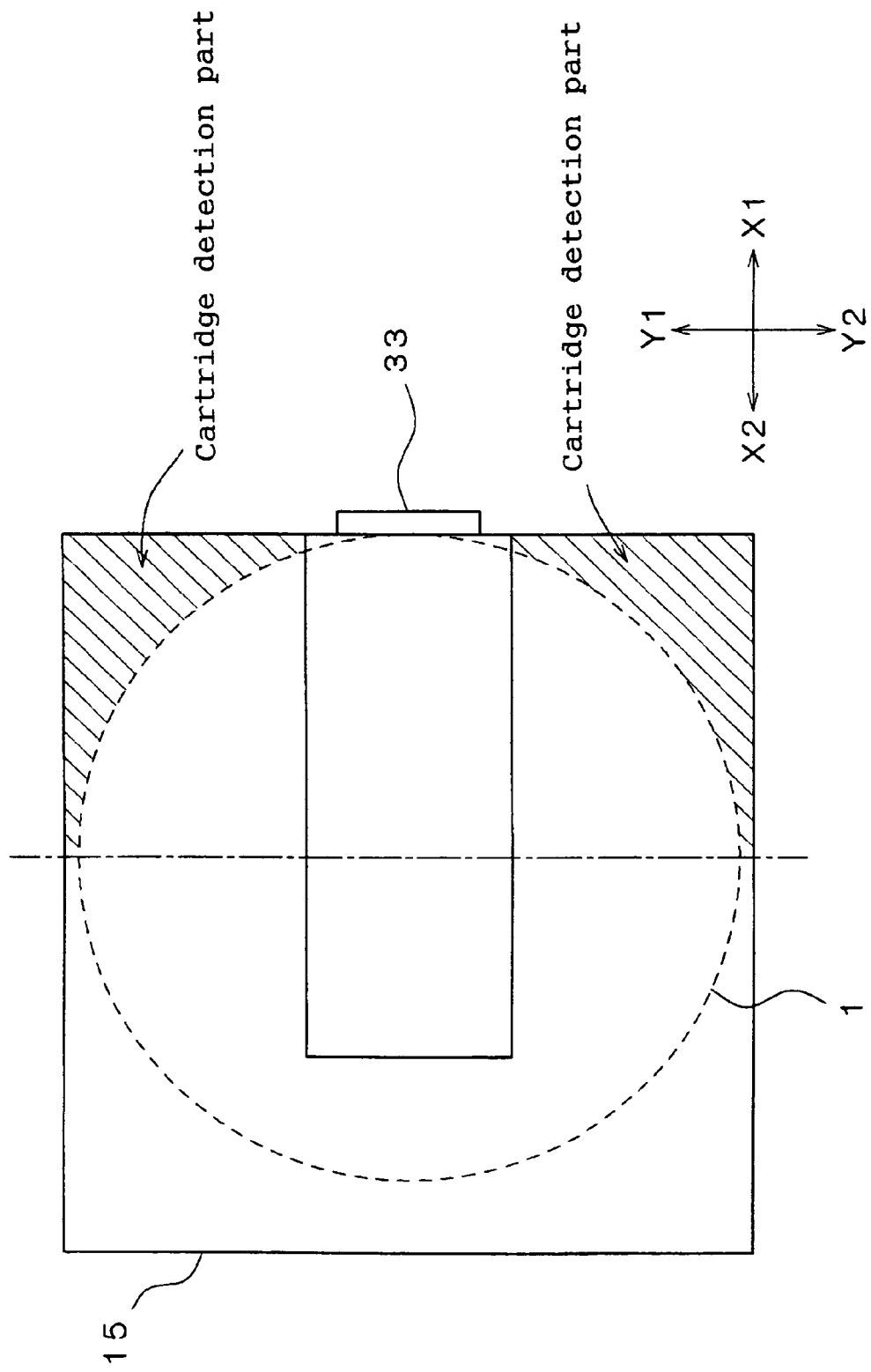
FIG. 6 is an explanatory view of a range where cartridge detecting means can be set in the embodiment of the present invention.
Figure 7:
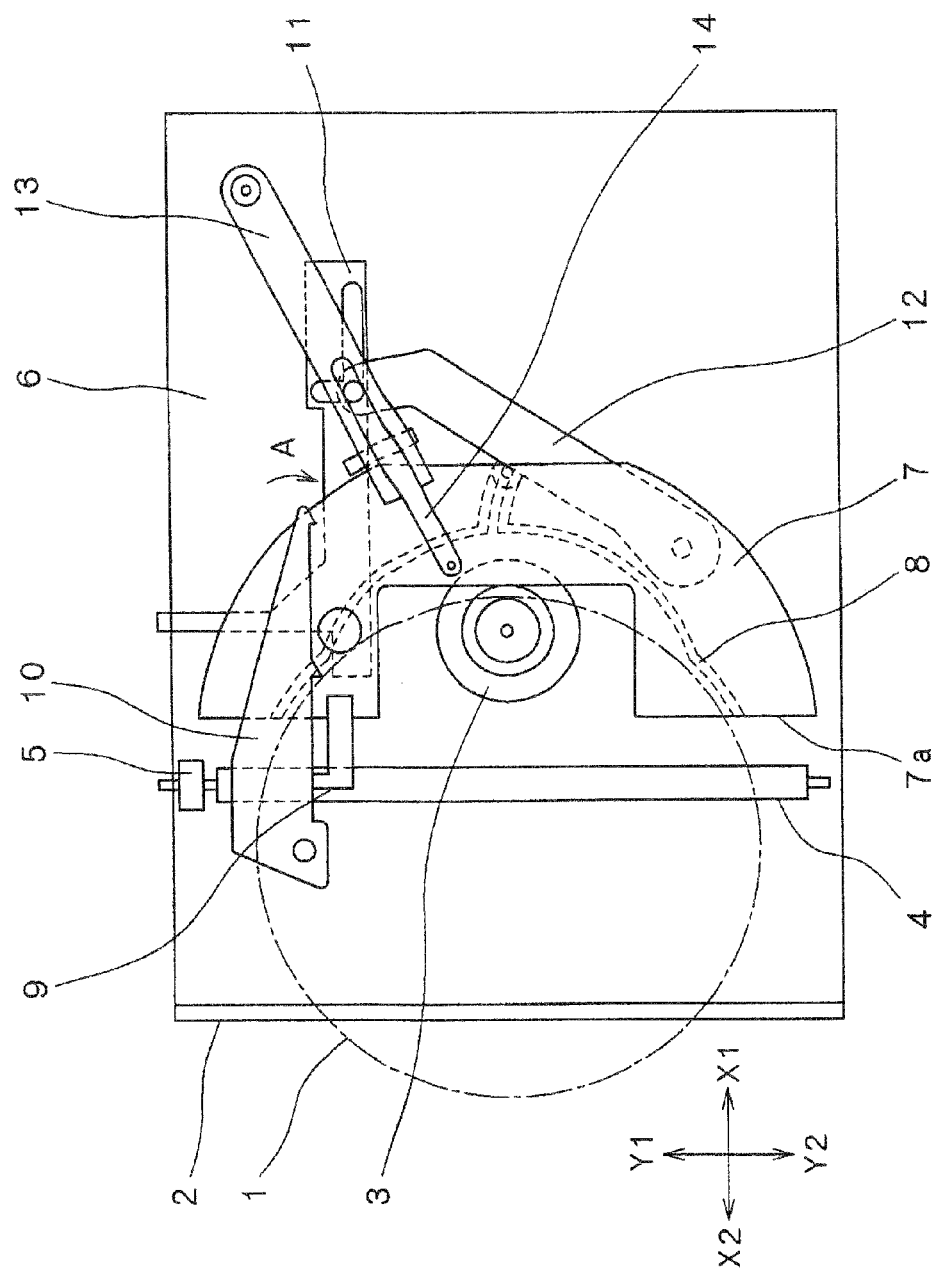
FIG. 7 is a plan view showing the condition where the disc is inserted in the conventional disc loading device.
Figure 8:
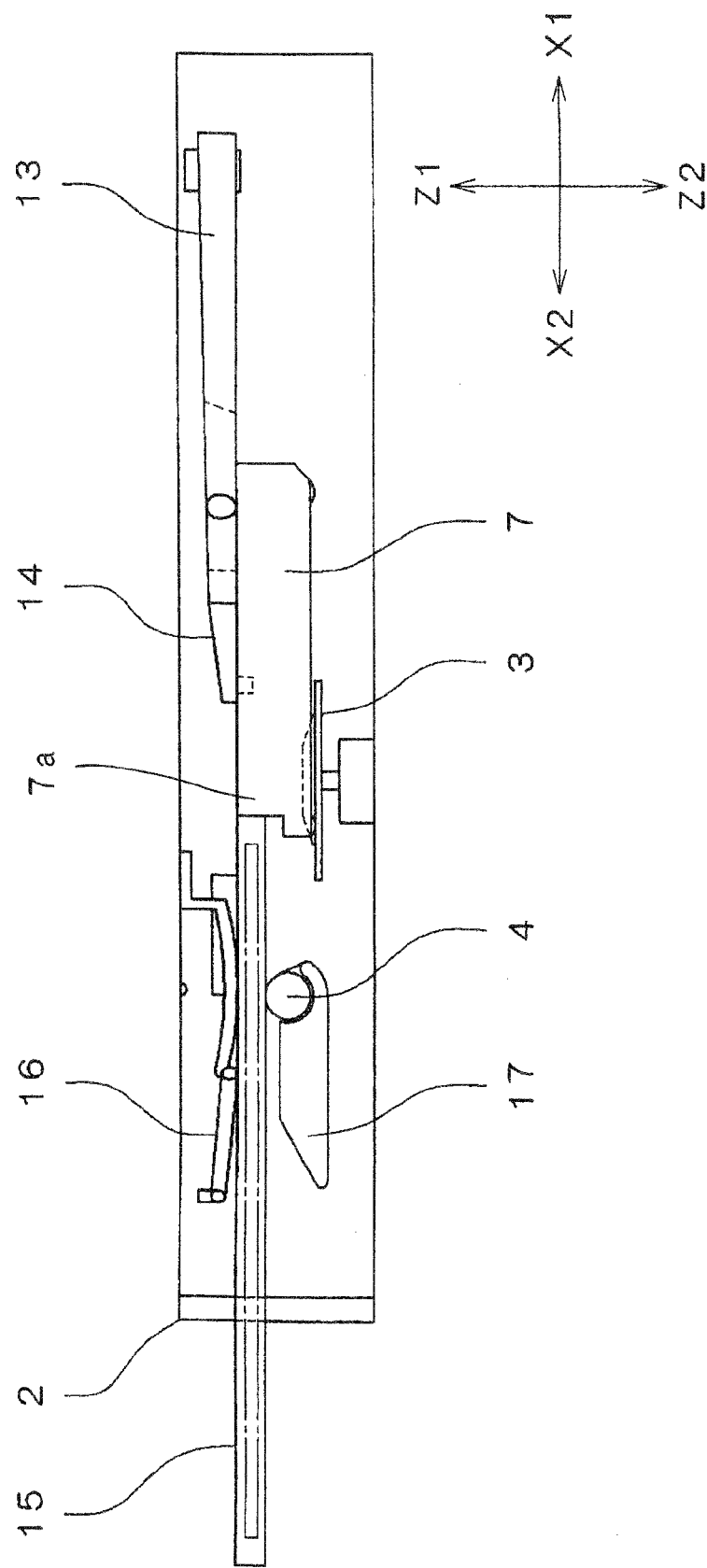
FIG. 8 is a side view showing the condition where the cartridge is inserted in the conventional disc loading device.

While in the above description, the switching lever 21 is used as the cartridge detecting means and the detection of the cartridge 15 is performed mechanically, an electric switch or a photosensor may be used. For example, when a photosensor is used, the position where the photosensor for cartridge detection is set is set in the vicinity of the opening so that the part of the cartridge 15 as shown by the hatch lines of FIG. 6 can be detected. The hatched part of FIG. 6 is a part that is situated in the X1 direction from the center of the disc 1 when the disc 1 is superposed on the cartridge 15 in a position where the rim, in the X1 direction, of the disc 1 is in contact with the end surface, in the X1 direction, of the cartridge 15, and a part excluding the part of the disc 1 projected in the vertical direction of the figure and excluding the part of the shutter 33. That is, the hatched part of FIG. 6 is, of the part that passes through the opening 2 first when the disc 1 or the cartridge 15 is inserted, the part that is different between the disc 1 and the cartridge 15, and by detecting this cartridge detection part, discrimination between the disc 1 and the cartridge 15 can be accurately made. When a photosensor is set, it is desirable to use two photosensors, and it is desirable that a first photosensor be set in a position, close to the shutter, of the cartridge detection part of FIG. 6 and a second photosensor be set in a position whose position in the X direction is the same as the position where the first photosensor is set and that is close to the side surface of the cartridge 15 in the Y direction. When the first sensor and the second sensor simultaneously detect insertion, it is determined that the cartridge 15 is inserted, and when only the first sensor detects insertion, it is determined that the disc 1 is inserted. When it is determined that the cartridge 15 is inserted, the switching motor 23 is driven based on the outputted signal to thereby move the roller 4 to the second position.

While the insertion of the cartridge 15 is detected by the switching lever 21 and the switching arm 22 and the conveying means is automatically switched from the disc conveying means to the cartridge conveying means, the following structure may be adopted: A switch is provided, the user previously selects which of the disc 1 and the cartridge 15 is inserted by the switch, and the switching motor 23 is driven by the output signal of the switch to switch the conveying means.

Moreover, while the slide member 25 as the cartridge conveying means is also driven when the disc 1 is inserted, by previously forming the engagement member 26 in a position not interfering with the locus of movement of the disc 1, it is unnecessary to drive the slide member 25 when the disc 1 is conveyed.

Moreover, while the roller 4 as the disc conveying means is held in a position not abutting the cartridge 15 and is stopped in the position when the cartridge 15 is inserted, the roller 4 may continue rotating. Or the roller 4 may be used as auxiliary conveying means when the cartridge 15 is conveyed, by holding the roller 4 in a position that abuts the cartridge 15 and rotating the roller 4 in the position.

Moreover, while the slide member 25 and the engagement portion 26 as the conveying means for the cartridge 15 are provided on the side of the side surface, in the Y1 direction, of the cartridge 15, they may be provided on the side of the side surface in the Y2 direction.

Moreover, they may be on both sides of the side surfaces in the Y1 direction and the Y2 direction. In this case, the conveyance of the cartridge 15 is further stabilized.

The present invention is not limited to the above-described embodiment.

The disc loading device according to the present invention is also applicable to uses required to realize stable conveyance of the disc and the cartridge by providing a roller as disc conveying means; providing, as cartridge conveying means, means for conveying the cartridge together with the slide member with the claw of the slide member being engaged with the side surface of the cartridge; and switching the conveying means so that when the disc is inserted, the disc is conveyed by the roller and when the cartridge is inserted, the cartridge is conveyed by the slide member.

What is claimed is:

1. A disc loading device, in a disc drive device, that allows a disc-form recording medium and a cartridge containing the disc-form recording medium to be slotted in through a single opening provided in a cabinet, the disc loading device comprising:
   a first conveying unit to convey the disc-form recording medium;
   a second conveying unit to convey the cartridge;
   a cartridge detecting unit to detect that the cartridge is inserted;
   a guiding unit to guide the inserted disc-form recording medium by pushing the disc-form recording medium in a direction of the first conveying unit; and
   a first conveying unit moving unit to move the first conveying unit selectively to a first position forming a space that allows the disc-form recording medium to be conveyed therethrough by sandwiching the disc-form recording medium between the guiding unit and the first conveying unit moving unit or to a second position forming a space that allows the cartridge to be conveyed therethrough, and holding the first conveying unit in the position to which the first conveying unit is moved,
   wherein when the disc-form recording medium is inserted or ejected, the disc-form recording medium is conveyed by the first conveying unit,
   wherein when the cartridge is inserted or ejected, the cartridge is conveyed by the second conveying unit, and
   wherein when the cartridge is not detected by the cartridge detecting unit, the first conveying unit moving unit moves the first conveying unit to the first position and holds the first conveying unit in the first position, and when the cartridge is detected by the cartridge detecting unit, the first conveying unit moving unit moves the first conveying unit to the second position and holds the first conveying unit in the second position.

2. A disc loading device according to claim 1, wherein the cartridge detecting unit is disposed between the opening and the first conveying unit, and detects insertion only when the cartridge is inserted.

3. A disc loading device according to claim 2, wherein the cartridge detecting unit detects an outer part of the cartridge excluding a part of projection of a recording surface of the disc-form recording medium contained in the cartridge.

4. A disc loading device according to claim 1, wherein the first conveying unit comprises a roller.

5. A disc loading device according to claim 1, wherein a disc latching member that receives and latches the conveyed disc-form recording medium and performs centering in a play position is provided in a position not interfering with a locus of movement of the cartridge.

6. A disc loading device according to claim 5, further comprising a disc guide that is disposed in a position opposed to the first conveying unit and guides the disc-form recording medium that is being conveyed, wherein the disc guide abuts the disc-form recording medium that is being conveyed, and pushes down the disc-form recording medium.

* * * * *